United States Patent
Mui et al.

(10) Patent No.: US 9,924,233 B2
(45) Date of Patent: Mar. 20, 2018

(54) SYSTEMS AND METHODS FOR CONTROLLING A SINGLE-WIRE MULTISWITCH DEVICE

(71) Applicant: The DIRECTV Group, Inc., El Segundo, CA (US)

(72) Inventors: Benjamin Mui, Los Angeles, CA (US); Kushan Shah, Torrance, CA (US); Bradley T. Ito, Rowland Heights, CA (US)

(73) Assignee: THE DIRECTV GROUP, INC., El Segundo, CA (US)

( * ) Notice: Subject to any disclaimer, the term of this patent is extended or adjusted under 35 U.S.C. 154(b) by 108 days.

(21) Appl. No.: 14/693,663

(22) Filed: Apr. 22, 2015

(65) Prior Publication Data

US 2017/0013319 A1    Jan. 12, 2017

(51) Int. Cl.
| | |
|---|---|
| *H04N 21/482* | (2011.01) |
| *H04N 21/61* | (2011.01) |
| *H04N 21/647* | (2011.01) |
| *H04B 7/185* | (2006.01) |
| *H04W 60/04* | (2009.01) |

(52) U.S. Cl.
CPC ....... *H04N 21/482* (2013.01); *H04B 7/18523* (2013.01); *H04N 21/6193* (2013.01); *H04N 21/647* (2013.01); *H04W 60/04* (2013.01)

(58) Field of Classification Search
CPC ...... H04N 7/20; H04N 7/104; H04N 21/6193; H04N 21/647; H01Q 1/247; H01Q 5/45; H04B 7/18523; H04B 1/006; H04H 40/90; H04W 72/0453
See application file for complete search history.

(56) References Cited

U.S. PATENT DOCUMENTS

| 7,945,932 B2 * | 5/2011 | James | H01Q 1/247 725/63 |
|---|---|---|---|
| 2006/0225098 A1 * | 10/2006 | James | H01Q 1/125 725/63 |
| 2006/0225099 A1 * | 10/2006 | James | H01Q 19/17 725/63 |
| 2006/0225100 A1 * | 10/2006 | James | H04N 7/20 725/63 |
| 2006/0225102 A1 * | 10/2006 | James | H01Q 1/247 725/68 |

(Continued)

*Primary Examiner* — Benjamin R Bruckart
*Assistant Examiner* — Jen-Shi Huang
(74) *Attorney, Agent, or Firm* — Guntin & Gust, PLC; Matthew Tropper

(57) ABSTRACT

This disclosure relates to a devices and methods related to satellite information broadcasting. An embodiment may relate to a device that includes a plurality of respective tuning channels. The device includes a controller configured to transmit a registration query and receive a registration request from a client device. The registration request may include a client identifier and a tuner quantity. The tuner quantity may indicate the number of tuners associated with the client device. The controller may assign at least one tuning channel to the client device based on the tuner quantity. Furthermore, the controller may transmit a registration confirmation message to the client device. The registration confirmation message may include the respective tuning channel identifier of the at least one assigned tuning channel.

20 Claims, 5 Drawing Sheets

(56) References Cited

U.S. PATENT DOCUMENTS

| | | | |
|---|---|---|---|
| 2006/0225103 A1* | 10/2006 | James | H04N 7/20 |
| | | | 725/68 |
| 2006/0225104 A1* | 10/2006 | James | H01Q 1/125 |
| | | | 725/68 |
| 2007/0220559 A1* | 9/2007 | James | H04H 40/90 |
| | | | 725/63 |
| 2008/0016535 A1* | 1/2008 | James | H04H 40/90 |
| | | | 725/63 |
| 2013/0174209 A1* | 7/2013 | Jung | H04N 21/00 |
| | | | 725/118 |
| 2015/0195478 A1* | 7/2015 | Hieb | H04N 5/50 |
| | | | 348/731 |

\* cited by examiner

SYSTEMS AND METHODS FOR CONTROLLING A SINGLE-WIRE MULTISWITCH DEVICE

BACKGROUND

Satellite broadcasting of information may involve substantial infrastructure to deliver signals to terrestrial client devices. For example, a plurality of ground-based microwave transmitters may transmit information to a plurality of satellites along a communication uplink. The plurality of satellites may be in geostationary orbit in a corresponding plurality of orbital slots. Each satellite may retransmit the information toward ground locations as one or more satellite transponder signals via a communication downlink. An outdoor unit (ODU), usually mounted to a building housing the client device, may receive the one or more satellite transponder signals and convert the carrier frequency of each transponder signal to an intermediate frequency (IF) signal. The client device may send a tuning request to the ODU or an intermediary device, such as a Single-Wire Multiswitch (SWM). The tuning request may include a requested transponder. In response, the IF signal or a particular transponder from the IF signal may be delivered to a client device. Accordingly, a tuner of the client device may then tune to a particular center frequency of the IF signal or the transponder signal in order to properly receive a particular channel.

ODUs may be configured to receive a plurality of transponder signals from multiple satellites. Furthermore, the client devices may include a plurality of tuners and/or tuning channels. However, current ODUs may poll each individual tuner or tuning channel. Namely, each polling action may include a waiting time during which the ODU may wait for a new tuning request corresponding to each tuner of the client device. Thus, the time needed to poll all of the tuners has increased with the rise of the available number of tuners and tuning channels.

SUMMARY

In a first aspect, a device is provided. The device includes a plurality of frequency conversion modules configured to provide respective tuning channels with respective tuning channel identifiers and respective center frequencies. The device also includes a multiswitch configured to connect at least one of a plurality of intermediate frequency (IF) inputs to at least one of the respective tuning channels. The device further includes a controller. The controller includes a processor, a memory, and a communication module. The communication module is configured to communicate with one or more client devices via a bi-directional communication link. The controller is configured to transmit a registration query via the bi-directional communication link. The controller is also configured to receive a registration request from a client device. The registration request includes a client identifier and a tuner quantity indicative of a number of client tuners associated with the respective client device. The controller is further configured to assign at least one tuning channel to the client device based on the tuner quantity and transmit a registration confirmation message to the client device. The registration confirmation message includes the respective tuning channel identifier of the at least one assigned tuning channel.

In a second aspect, a device is provided. The device includes a plurality of frequency conversion modules configured to provide a plurality of respective tuning channels and a multiswitch configured to connect at least one of a plurality of intermediate frequency (IF) inputs to at least one of the respective tuning channels. The device also includes a controller. The controller includes a processor, a memory, and a communication module. The communication module is configured to communicate with one or more client devices via a bi-directional communication link. The controller is configured to transmit a tuning query via the bi-directional communication link. The controller is further configured to receive a tuning request from a client device. The tuning request includes a requested transponder signal. The controller yet further is configured to cause the multiswitch to connect at least one of the plurality of IF inputs to at least one of the respective tuning channels based on the tuning request.

In a third aspect, a method is provided. The method includes transmitting, from a Single-Wire Multiswitch (SWM) device, a registration query via a bi-directional communication link. The SWM device includes a plurality of frequency conversion modules configured to provide respective tuning channels with respective tuning channel identifiers and respective center frequencies. The method also includes receiving a registration request from a client device. The registration request includes a client identifier and a tuner quantity indicative of a number of client tuners associated with the client device. The method further includes assigning at least one tuning channel to the client device based on the tuner quantity. The method additionally includes transmitting a confirmation message to the client device. The confirmation message includes the respective tuning channel identifier of the at least one assigned tuning channel.

Other aspects, embodiments, and implementations will become apparent to those of ordinary skill in the art by reading the following detailed description, with reference where appropriate to the accompanying drawings.

DETAILED DESCRIPTION

In the following detailed description, reference is made to the accompanying figures, which form a part hereof. It should be understood, however, that the arrangements described herein are set forth as examples only. As such, those skilled in the art will appreciate that other arrangements and elements (e.g., machines, interfaces, functions, orders of functions, etc.) can be used instead or in addition. Further, many of the elements described herein are functional entities that may be implemented as discrete or distributed components or in conjunction with other components, and in any suitable combination and location. Various functions described herein as being performed by one or more entities may be carried out by hardware, firmware or software logic. For instance, various functions described herein may be carried out by a processor executing instructions written in any suitable programming language and stored in memory.

In this description, the articles "a" or "an" are used to introduce elements of the example embodiments. The intent of using those articles is that there is one or more of the elements. The intent of using the conjunction "or" within a described list of at least two terms is to indicate any of the listed terms or any combination of the listed terms. The use of ordinal numbers such as "first," "second," "third" and so on is to distinguish respective elements rather than to denote a particular order of those elements.

I. OVERVIEW

Figure 1A:
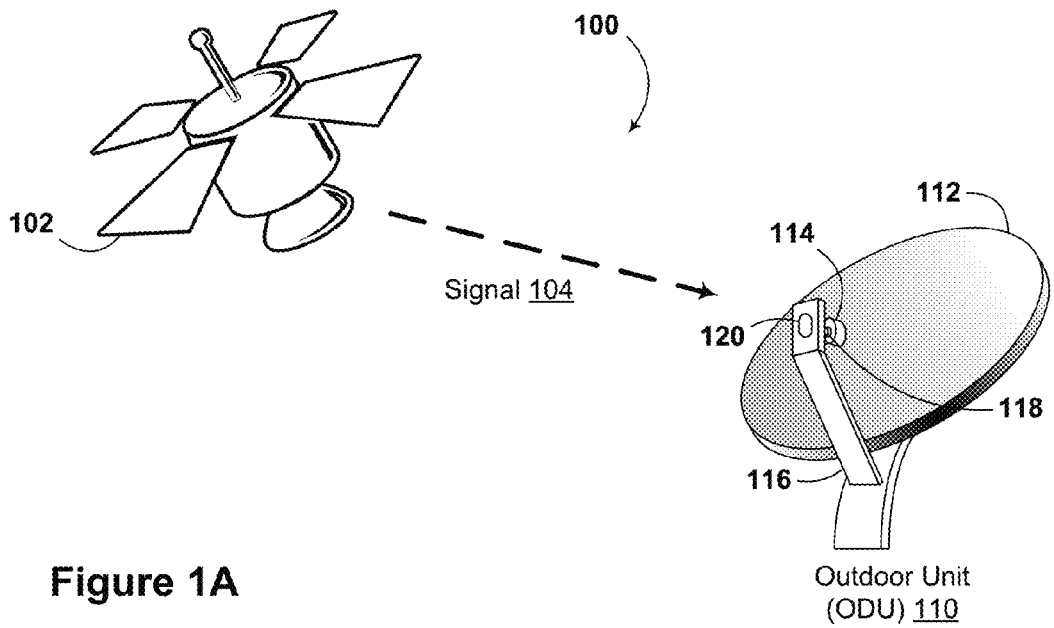
FIG. 1A is a schematic diagram illustrating a system, according to an embodiment.

FIG. 1A is a schematic diagram illustrating a system 100, according to an embodiment. System 100 may relate to a satellite communication downlink scenario. For example, one or more satellites 102 may transmit a signal 104 in one or more radio frequency (RF) bands, e.g. the microwave Ka-band (26.5-40 GHz) and/or Ku-band (12.4-18 GHz). The signal 104 may additionally or alternatively include other RF bands, e.g. 12.2-12.7 GHz and/or 18.3-20.2 GHz. In a scenario with two or more satellites 102, each satellite 102 may occupy a different geostationary orbital slot.

The signal 104 may be a media signal that may include video or audio signals. The signal 104 may also include a television signal. The content of the signal may vary based on the type of signal. For example, the content may include television programming content, program guide data or other types of data.

In an example embodiment, the signal 104 may include a plurality of video and audio channels transmitted together on a single wideband carrier, which may be associated with a particular transponder signal. The signal 104 may include one or more transponder signals transmitted from a particular satellite 102. The one or more satellites 102 may transmit the signal 104 toward terrestrial locations on the Earth, such as an Outdoor Unit (ODU) 110. The ODU 110 may be mounted on a building and may include an antenna 112, at least one feed horn 114, at least one low-noise block down-converter (LNB) 120, and a support arm 116. The antenna 112, which may include a parabolic dish antenna, may collect and direct the broadcast signals toward the at least one feed horn 114. Each of the feed horns 114 may be associated with at least one LNB 120.

The feed horn 114 may be located proximate to a focus of the antenna 112 and may be coupled to a waveguide 118. The waveguide 118 may be a hollow metal pipe with a rectangular or circular cross-section. Alternatively or additionally, the waveguide 118 may include dielectric materials. The dimensions of the waveguide 118 may be configured so as to efficiently transmit the radio frequency signals along its length. The RF signal in the waveguide 118 and/or feed horn 114 may be coupled to a coaxial cable or another type of electrical connection as an input to the LNB 120.

Figure 1B:
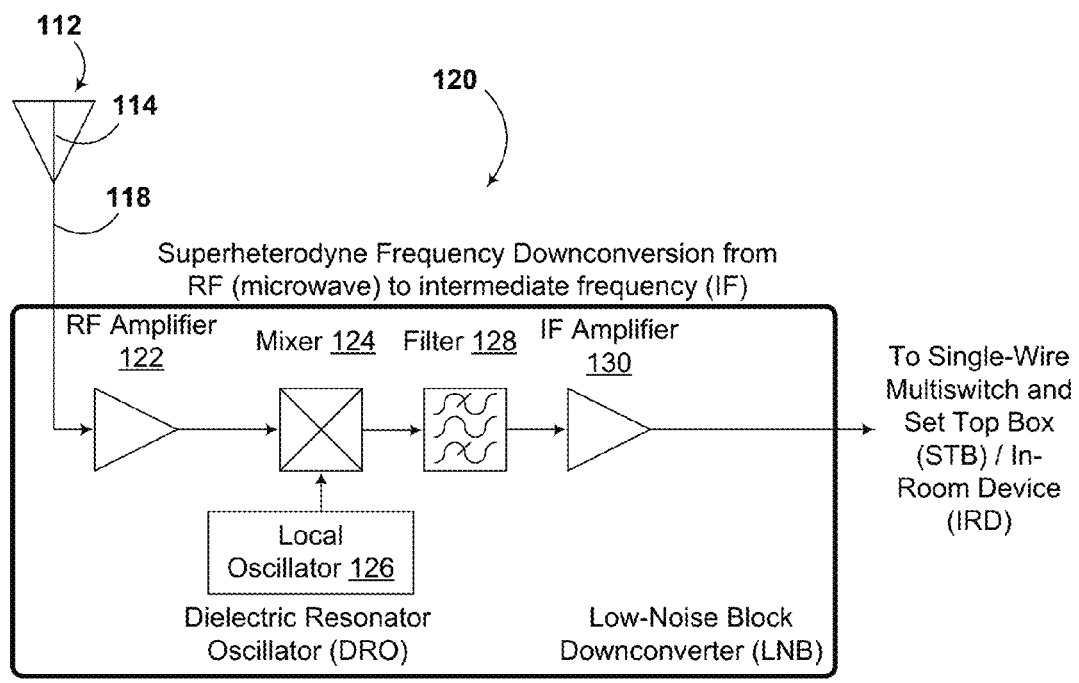
FIG. 1B is a schematic diagram illustrating a low-noise block down-converter, according to an embodiment.

FIG. 1B is a schematic diagram illustrating an LNB 120, according to an embodiment. The LNB 120 includes an RF amplifier 122, a mixer 124, a local oscillator 126, a filter 128, and, optionally, an intermediate-frequency (IF) amplifier 130. The RF amplifier 122 may be a low-noise amplifier (LNA) operable to amplify the RF signal from waveguide 118 and/or feed horn 114. The mixer 124 may include a circuit configured to mix the output of the RF amplifier 122 with a signal, usually a sine wave, from the local oscillator 126. The local oscillator 126 may include a dielectric resonator oscillator (DRO). The DRO may have a fixed oscillation frequency or a variable oscillation frequency. Other types of local oscillators are contemplated herein, such as a phase-locked loop.

The mixer 124 may be a superheterodyne mixer operable to provide signals based on a sum and a difference of the RF signal and the local oscillator frequency, also known as a beat frequency. In some embodiments, the mixer 124 may include multiple frequency conversion stages, e.g. by mixing the RF signal with multiple local oscillators, etc.

The output of the mixer 124 may be provided as an input to the filter 128. The filter 128 may be configured to attenuate or remove portions of the RF signal and/or the local oscillator signal. The filter 128 may be a digital filter. Accordingly, in this situation, the output of the filter 128 may include an intermediate frequency (IF) signal. For example, the output of filter 128 may include a signal with a frequency range of 950 MHz-1450 MHz (L-Band). Alternatively, the output of filter 128 may span a different frequency range.

The output of filter 128 may be provided to the IF amplifier 130. The IF amplifier 130 may be configured to amplify signals in a predetermined range of frequencies. Frequency down-conversion and the subsequent IF amplification by the LNB 120 may allow the signal to be transmitted via a wire, a coaxial cable, or a fiber optic cable, as opposed to within a hollow metal waveguide.

In an example embodiment, the LNB 120, or portions thereof, may be located proximate to the feed horn 114 so as to minimize the length of the waveguide 118. For instance, the LNB 120 may be provided on the support arm 116. In other embodiments, the LNB 120 may be located elsewhere.

In some embodiments, a plurality of feed horns 114 may be provided. Furthermore, each of the plurality of feed horns 114 may have a corresponding LNB 120. Together, the plurality of feed horn/LNB pairs may be operable to receive signals from multiple satellites in geosynchronous earth orbit. For example, each feed horn/LNB pair may be configured to receive signals from a particular geosynchronous satellites located at a particular angle with respect to the antenna 112. Receiving signals from multiple satellites via a plurality of feed horns 114 and their respective LNBs 120 may enable an increased data rate and/or enable other features, such as high-definition and/or 4K television images.

Figure 2:
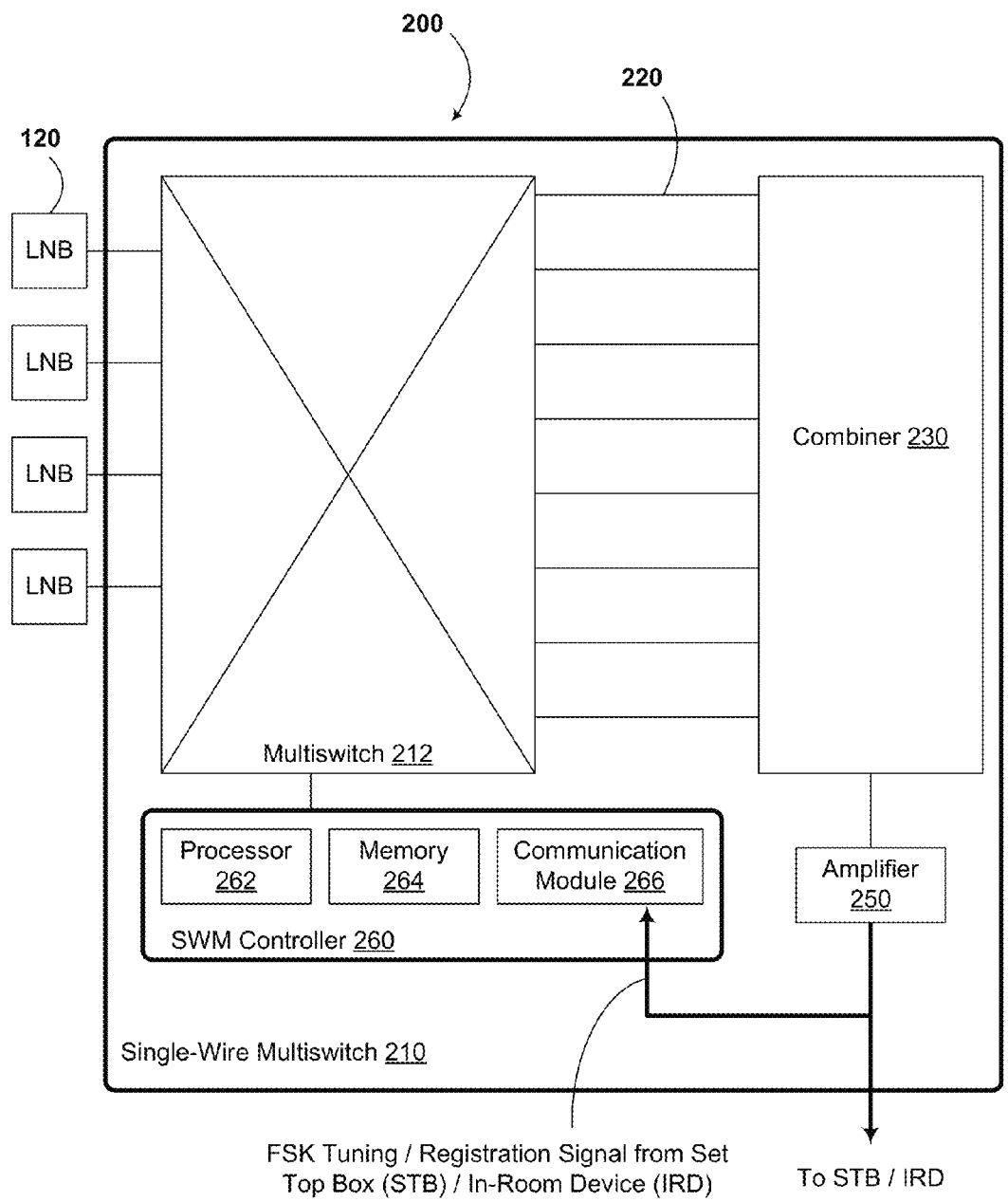
FIG. 2 is a schematic diagram illustrating a system, according to an embodiment.

FIG. 2 is a schematic diagram illustrating a system 200, according to an embodiment. System 200 may include a Single-Wire Multiswitch (SWM or SWiM) 210. The SWM 210 may include a multiswitch 212, one or more tuning channels 220, a combiner 230, an amplifier 250, and a SWM controller 260.

In some embodiments, the SWM 210 may include thirteen, twenty-three, or more tuning channels 220. Each tuning channel 220 may be operable to transmit an IF signal to an in-room device, as described below.

In an example embodiment, the SWM 210 may include an analog to digital converter (ADC). In such scenarios, some or all of the functions of the SWM 210 may be performed with a digital signal processing (DSP) chip or integrated circuit. That is, the SWM 210 may convert signals from analog to digital and thereafter handle or modify the signals in a digital fashion. Alternatively, some or all of the elements and/or functions of SWM 210 may be performed with analog devices. In an embodiment, the LNBs 120 may be fully or partially incorporated into the SWM 210. Alternatively, the LNBs 120 may be provided separately from the SWM 210.

In an example embodiment, the SWM 210 may receive a plurality of IF signals from respective LNBs 120 as described above in reference to FIGS. 1A and 1B. The plurality of IF signals may relate to one or more frequency-downconverted transponder signals from a plurality of satellites. Each transponder signal may in turn include signals relating to a plurality of broadcast channels. Each transponder signal may have a respective transponder center frequency.

Each tuning channel 220 may be switchably coupled to any of the IF signals from the LNBs 120 via the multiswitch 212. In an example embodiment, each tuning channel 220 may be communicatively coupled to a particular IF signal based on control signals received from the SWM controller 260. The tuning channel 220 may be connected to the particular IF signal via a crossbar switch associated with multiswitch 212. Other ways to communicatively couple a tuning channel 220 to a given IF input are possible.

The tuning channels 220 may be combined via combiner 230 and the combined signal may be amplified via amplifier 250. The amplified signal may be transmitted to one or more set top boxes (STB), in-room devices (IRDs), or client devices via a cable and/or one or more wireless communication links.

The SWM controller 260 may include a processor 262, a memory 264, and a communication module 266. The processor 262 may be a microprocessor of a computing device, a microcontroller, a digital signal processor (DSP), multi-core processor, etc. Additionally or alternatively, the processor 262 may include multiple computing devices, such as in a distributed computing network. Processor 262 may be used to coordinate or control multiswitch 212, the tuning channels 220, and any other components of system 200 that may or may not be illustrated in FIG. 2.

The memory 264 may include a non-transitory computer-readable medium, for example, such as computer-readable media that stores data for short periods of time like solid-state memory, flash drives, register memory, processor cache, and Random Access Memory (RAM). The computer-readable medium may also or alternatively include non-transitory media, such as secondary or persistent long-term storage, like read only memory (ROM), optical or magnetic disks, compact disc read-only memory (CD-ROM), for example. The computer-readable medium may also be any other volatile or non-volatile storage system. The computer-readable medium may, for example, be considered a computer-readable storage medium, a tangible storage device, and/or memory distributed within a computing network.

Additionally or alternatively, memory 264 may include removable storage devices, non-removable storage devices, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), memory cards, smart cards and tape drives to name a few. Computer storage media can include volatile and nonvolatile, transitory, non-transitory, removable and non-removable media implemented in any method or technology for storage of information, such as computer-readable instructions, data structures, program modules, or other data.

The communication module 266 may be configured to receive commands from an IRD via a wired or wireless communication link. In an example embodiment, the communication module 266 may be operable to receive and transmit frequency-shift keyed (FSK) messages via the wired or wireless communication link. For example, the FSK messages may be transmitted and received via the same cable as that providing the amplified and modulated transponder signals to the IRD. In an embodiment, digital signals may be transmitted and received by the communication module 266 and the IRD according to a binary FSK (BFSK) protocol. In such a scenario, the communication link may be bi-directional and may include signals having a center frequency of 2.3 MHz. Other center frequencies are possible for the communication link.

The SWM controller 260 may control several aspects of the SWM 210. For example, as described above, the SWM controller 260 may be operable to control the multiswitch 212 to communicatively couple various IF inputs/transponder channels to each respective tuning channel 220. In such a scenario, the SWM controller 260 may receive a request from a particular IRD via the communication module 266. The request from the particular IRD may include a tuning request for one or more particular IF signals. In response, the SWM controller 260 may cause the multiswitch 212 to communicatively couple the corresponding tuning channels 220 to the particular IF signals in an effort to provide the requested transponder channels to the particular IRD according to the tuning request.

Figure 3:
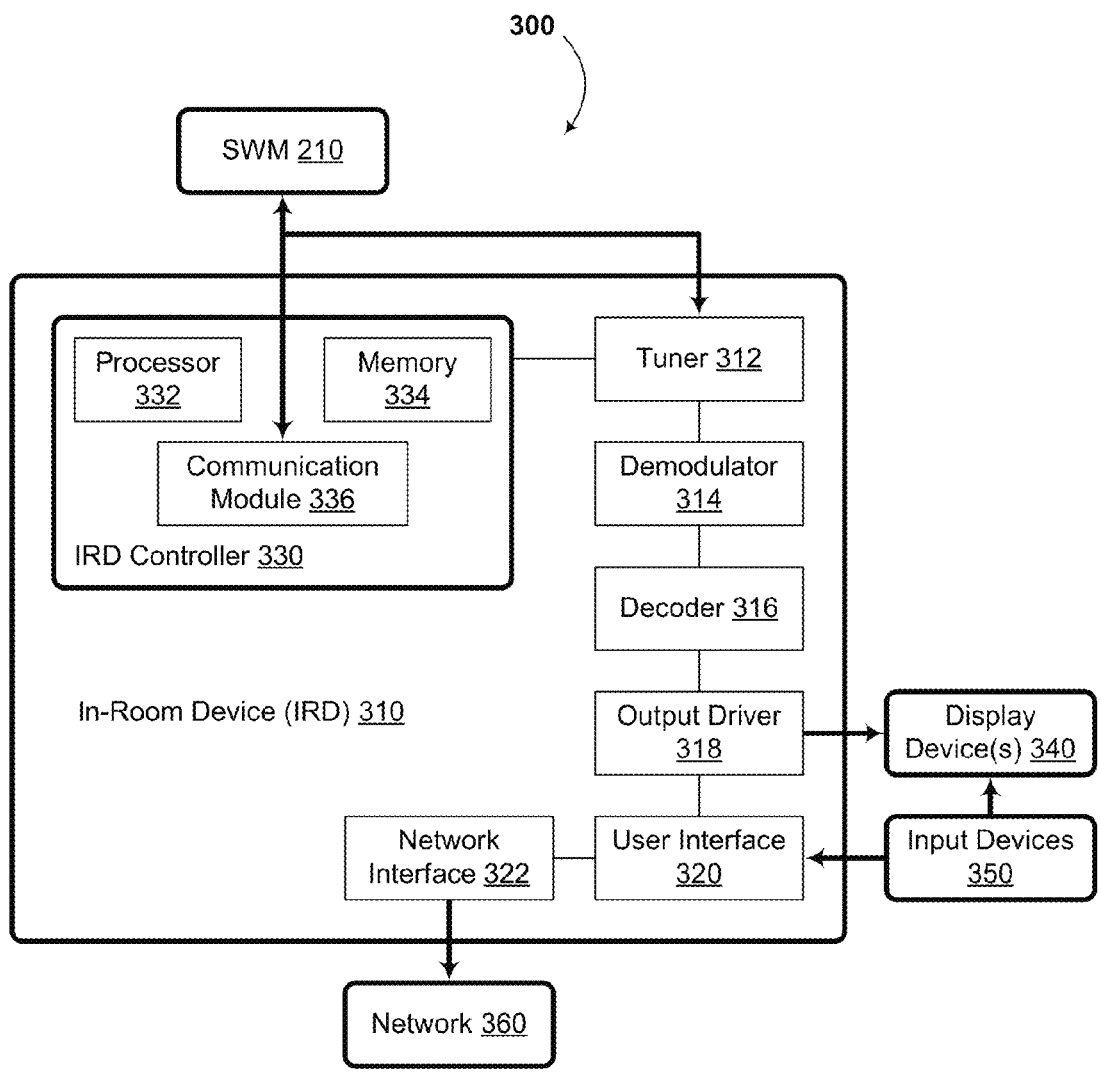
FIG. 3 is a schematic diagram illustrating a system, according to an embodiment.

FIG. 3 is a schematic diagram illustrating a system 300, according to an embodiment. System 300 may include an In-Room Device (IRD) 310. The IRD 310 may be used for television or other media. As another example, IRD 310 may include or be arranged as a landline or cellular telephone, smartphone, personal computer, laptop computer, tablet computer, personal digital assistant (PDA), portable media player, set-top box, a television or component of a television, or other computing device now known or later developed.

The IRD 310 may receive signals via a wired or wireless communication link from the SWM 210, as illustrated and described in reference to FIG. 2. The IRD 310 may handle some or all signals from SWM 210 digitally. As such, the IRD 310 may include an ADC and/or a DAC. Furthermore, some or all elements of IRD 310 may be included in a DSP chip, although analog embodiments are also contemplated herein.

The IRD 310 may include at least one tuner 312, at least one demodulator 314, at least one decoder 316, and at least one output driver 318. Although, a particular configuration of system 300 is illustrated, the configuration is merely representative of various possible embodiments. For example, although only one tuner 312, one demodulator 314, and one decoder 316 are illustrated, multiple tuners, demodulators, or decoders may be provided within system 300. The components described in reference to FIG. 3 may be communicatively linked by a system bus, a network, or another connection.

The display device 340 may include a television, a monitor, or another device configured to display images. The images may be video, graphics, text, or any variety of other visual representations. In some examples, the display device 340 may include an audio output, such as a loudspeaker, to generate sound waves from media signals received by the display device 340.

Display device 340 may communicate with the output driver 318 to facilitate communication between IRD 310 and display device 340. In some implementations, output driver 318 may work in conjunction with a graphics processing unit (not illustrated), which can be configured to communicate with display device 340. Output driver 318 can communicate with display device 340 by a high-definition multiple interface (HDMI) cable, a coaxial cable, some other wired communication link, or wirelessly.

The IRD 310 may additionally include a network interface 322 and an IRD controller 330. One or more input devices 350 may communicate with the IRD 310 via a user interface 320. The input devices 350 may include a remote control, a keyboard, a mouse, a trackball, a smartphone, a smartwatch, a tablet, a personal computer, a voice-activated interface or another type of computing device. The input devices 350 may additionally include hardware and software configured to provide gesture recognition. The input devices 350 may be operable to directly or indirectly control the IRD 310, the SWM 210, the LNB 120, and/or other systems described herein. For example, a channel guide may be provided to a user via the user interface 320 and display device 340. In such a scenario, the user may use the input device 350 to select a requested channel.

In an example embodiment, the input device 350 may send a message to the IRD 310 via the user interface 320 and/or the communication module 336. The message may include a requested channel. In response to receiving a message with the requested channel, the IRD controller 330 may adjust one or more tuners 312 to provide the requested channel via the display device 340. Additionally or alternatively, the IRD controller 330 may transmit a tuning request to the SWM 210 via the communication module 336 according to the FSK protocol described above. Accordingly, in such a situation, the SWM controller 260 may adjust the multiswitch 212 and/or one or more tuning channels 220 so as to provide the IRD 310 with an IF signal corresponding to the requested channel.

The one or more input device 350 may also control one or more of the display devices 340. For instance, the input device 350 may be a universal remote configured to control various functions of the display devices 340 and other peripherals, e.g. CD/DVD/BD player, audio/video receiver, a media library, etc.

The network interface 322 may be operable to communicatively connect with a network 360. The network interface 322 may be a WiFi, WiMax, WiMax mobile, data over cable service interface specification (DOCSIS), wireless, cellular, or other types of interfaces. Moreover, network interface 322 may use a variety of protocols for communicating via the network 360. For instance, network interface 322 may communicate using Ethernet, a Transmission Control Protocol/Internet Protocol (TCP/IP), a hypertext transfer protocol (HTTP), or some other protocol.

The IRD controller 330 may include a processor 332, a memory 334, and a communication module 336. Similar to the SWM controller 260, the IRD controller 330 may be a computing device with one or more processors 332. The IRD controller 320 may be configured to control various aspects of the IRD 310. For example, the IRD controller 320 may cause the tuner 312 to tune a signal from the SWM 210 in an effort to provide a previously requested channel via the display devices 340.

II. EXAMPLE SYSTEMS

Example systems described herein may relate to any or all of system 100, system 200, and/or system 300 illustrated and described in reference to FIGS. 1A-B, 2, and 3. The embodiments described herein may allow a reduction in system tuning time by reducing a polling interval. For instance, the SWM may only send one tuning query per IRD, as opposed to one tuning query per tuner of the IRD. Furthermore, the embodiments described herein may support tuning requests that include multiple transponder requests. Such requests may be necessary for 4K bonded transponder programming.

Figure 4:
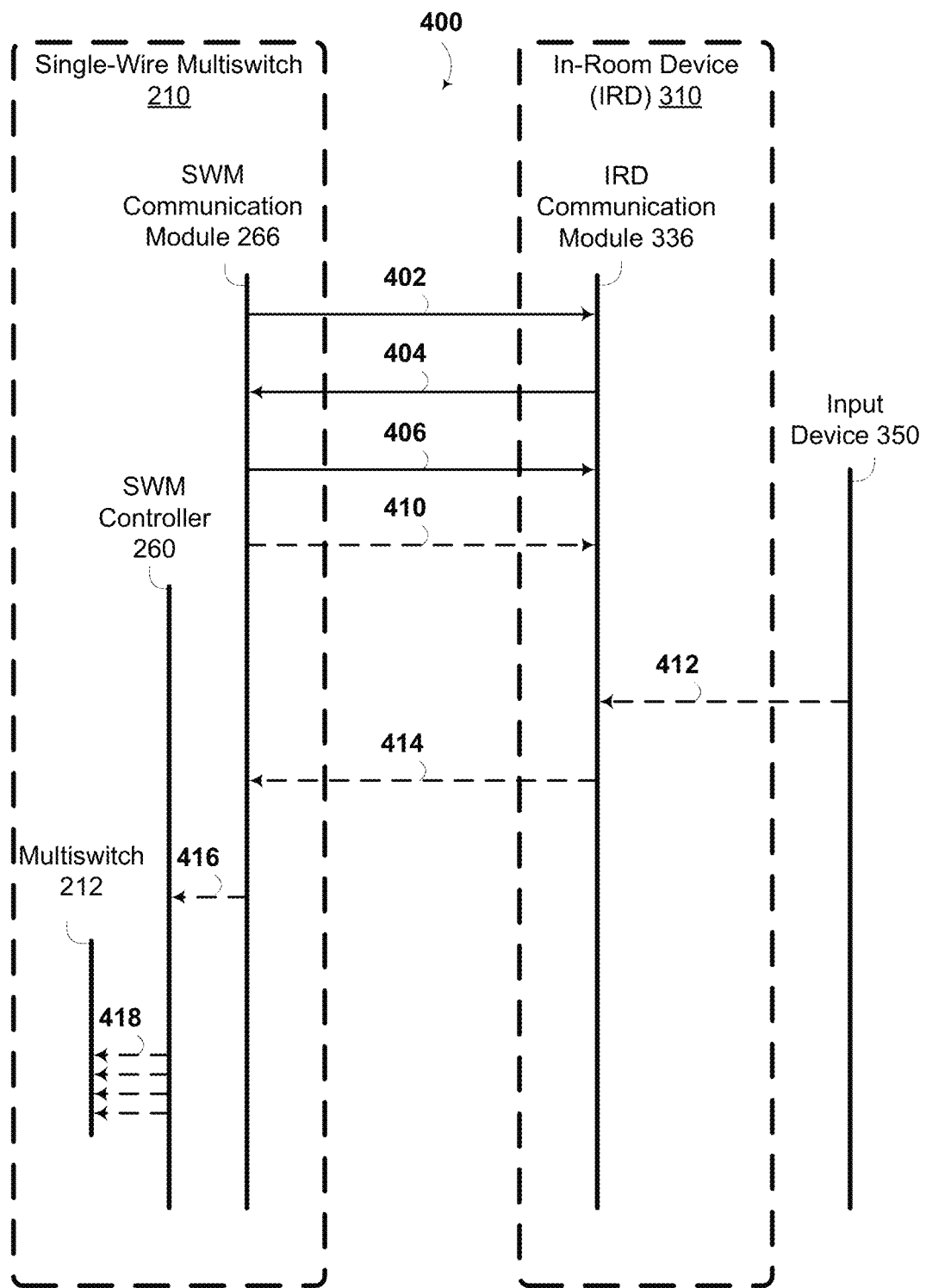
FIG. 4 is a schematic diagram illustrating messaging communications, according to an embodiment.

FIG. 4 is a schematic diagram 400 illustrating messaging communications, according to an embodiment. As illustrated in diagram 400, the communication module 266 of the SWM controller 260 may be configured to communicate with one or more client devices via a bi-directional communication link. The bi-directional communication link could be a wired or wireless communication link. For instance, the bi-directional communication link may include message transfer according to an FSK protocol.

In an example embodiment, the communication module 266 of SWM controller 260 may transmit a registration query 402 as a FSK message via the bi-directional communication link. The SWM controller 260 may send out such registration queries 402 via a polling process. That is, the SWM controller 260 may poll each previously registered device for new tuning requests or other information. Thereafter, the SWM controller 260 may send out a broadcast message offering new device registrations. In response, a previously-unregistered client device may attempt to register with the SWM 210.

The SWM controller 260 may be further configured to receive a registration request 404 from the previously-unregistered client device. The registration request 404 may include a client identifier and a tuner quantity. The client identifier may be a serial number or another identifier for the specific IRD 310 sending the registration request 404. The tuner quantity may represent a number of client tuners associated with the respective client device. Client tuners may be similar to tuner 312 described and illustrated in reference to FIG. 3. In other words, the previously-unregistered client device, or IRD 310, may, in response to the registration query, respond with a request to register X tuners where X is the number of available tuners on the IRD 310.

In response to receiving the registration request, the SWM controller 260 may assign at least one tuning channel to the client device based on the tuner quantity. The SWM controller 260 may also be configured to transmit a registration confirmation message 406 to the client device. As an example, the registration confirmation message 406 may include the respective tuning channel identifier of the at least one assigned tuning channel.

Optionally, the SWM controller 260 is also configured to transmit a tuning query 410 via the bi-directional communication link. For example, the SWM controller 260 may poll previously-registered IRDs 310 to determine whether any current tuning requests exist.

For instance, the SWM controller 260 may access a registration list that includes at least one previously-registered client device. As such, the SWM controller 260 may transmit one tuning query for each previously-registered client device.

In response, the one or more previously-registered IRDs 310 may respond by sending a tuning request 414. The tuning request 414 may include a requested transponder signal. For example, a user may have requested a particular channel from a channel guide or by entering the channel via an input device 350 of a requesting IRD, as illustrated by channel request 412 in FIG. 4. The requesting IRD, which may be IRD 310, may access a channel look-up table that relates specific channels to one or more transponder signals. Accordingly, the communication module 336 of the IRD controller 330 may transmit a tuning request 414 with the corresponding requested transponder to the SWM 210.

In response to the tuning request 414, the SWM controller 260 may be configured to cause the multiswitch 212 to connect at least one of the IF inputs from LNB 120 to at least one previously assigned tuning channel 220 based on the tuning request 414. For example, SWM controller 260 may receive a requested IF signal 416 based on tuning request 414. The SWM controller 260 may send switching command 418, which may cause the multiswitch 212 to connect at least one of the IF inputs corresponding to the requested IF signal 416 to at least one of the previously assigned tuning channels 220.

In some scenarios, the tuning request 414 may include a plurality of IF signals. For example, an IRD 310 may request three, four, or more IF signals in the same tuning request. In such a scenario, the requested IF signals may correspond to a 4K bonded transponder transmission. Other types of audio and/or visual broadcasts or data transmissions may be possible over multiple IF signals, e.g. bonded transponders. Thus, as illustrated, switching command 418 may cause the multiswitch 212 to communicatively couple a plurality of tuning channels 220 to one or more IF signals in a substantially simultaneous fashion. As such, the described system may reduce the time to tune to a plurality of bonded transponder signals.

By the term "substantially" it is meant that the recited characteristic, parameter, or value need not be achieved exactly, but that deviations or variations, including for example, timing, tolerances, measurement error, measurement accuracy limitations and other factors known to skill in the art, may occur in amounts that do not preclude the effect the characteristic was intended to provide. Thus, in this context, substantially simultaneously may include switching a plurality of tuning channels to their respective IF signals within 100 ms or less.

For example, as illustrated in FIG. 4, in response to a tuning request that includes four different requested transponder signals, the SWM controller 260 may be operable to cause the multiswitch 212 to connect one or more IF signals to four previously-assigned tuning channels based on the tuning request, via four switching commands 418. Furthermore, the switching process may be conducted substantially simultaneously for the four tuning channels such that the tuning channels may be communicatively coupled to their respective IF signals within 100 milliseconds. Other time periods are possible.

III. EXAMPLE METHODS

Figure 5:
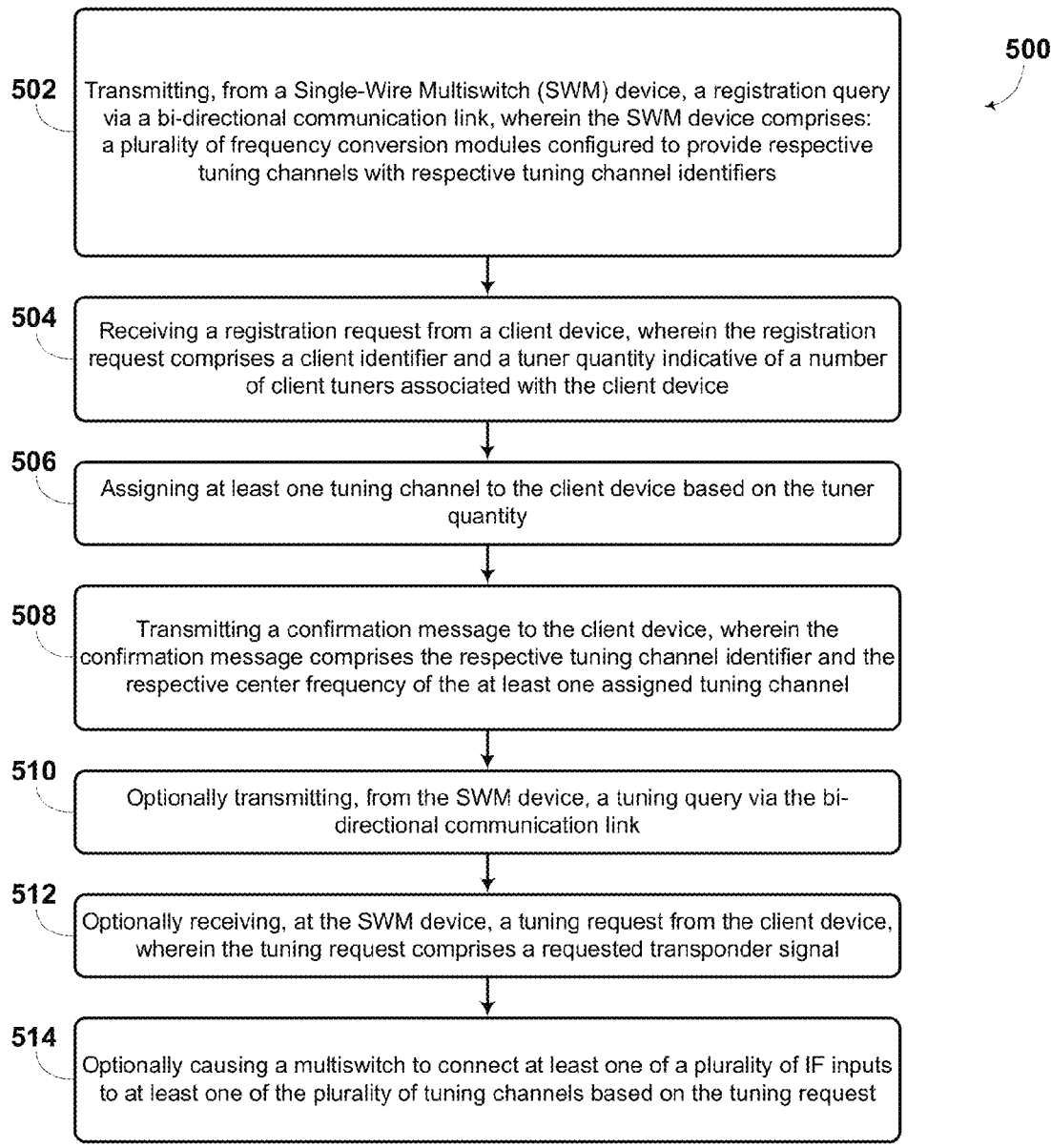
FIG. 5 illustrates a method, according to an embodiment.

FIG. 5 illustrates a method 500, according to an embodiment. The method may include various blocks or steps. The blocks or steps may be carried out individually or in combination. The blocks or steps may be carried out in any order and/or in series or in parallel. Further, blocks or steps may be omitted or added to method 500.

The blocks of method 500 may be carried out by system 200 as illustrated and described in reference to FIG. 2, however other elements may be used to carry out method 500, such as those in system 100 and system 300 from FIGS. 1 and 3. Furthermore, blocks of method 500 may be carried out fully, or in part, utilizing the messaging communications as illustrated and described in reference to FIG. 4.

Block 502 includes transmitting, from a Single-Wire Multiswitch (SWM) device, a registration query via a bi-directional communication link. The SWM device may be similar or identical to SWM 210. As such, the SWM device may include a plurality of frequency conversion modules configured to provide respective tuning channels with respective tuning channel identifiers. The SWM device may optionally include a multiswitch configured to connect at least one of a plurality of intermediate frequency (IF) inputs to at least one of the respective tuning channels. Each of the plurality of IF inputs may correspond to one or more respective transponder signals.

Block 504 includes receiving a registration request from a client device. Namely, the registration request includes a client identifier and a tuner quantity indicative of a number of client tuners associated with the client device. That is, a client device, such as IRD 310 may have four tuners 312. Accordingly, the registration request may include a client identifier specific to IRD 310 and a tuner quantity of four. Other tuner quantities are possible.

Block 506 includes assigning at least one tuning channel to the client device based on the tuner quantity. In the above-mentioned example, where the tuner quantity is four, the SWM controller 260 may assign four tuning channels 220 to the IRD 310 associated with the specific client identifier from the registration request. In some cases, the SWM controller 260 may not be able to assign the full amount of tuning channels as provided in the tuner quantity. For example, the SWM may not have enough available tuning channels.

Block 508 includes transmitting a confirmation message to the client device. The confirmation message may include the respective tuning channel identifier of the at least one assigned tuning channel. That is, the confirmation message may be transmitted via the bi-directional communication link according to an FSK encoding scheme. The confirmation message may include information indicative of the number of tuning channels assigned to the specific IRD, as well as the respective center frequencies, other identification, and/or encryption keys, etc.

Method 500 may optionally include other steps or blocks. For example, block 510 may include transmitting, from the SWM device, a tuning query via the bi-directional communication link. That is, as described above, the SWM device may poll registered devices to determine whether any registered client device is currently requesting a new tuning setting and/or a new transponder. The SWM device may poll previously-registered client devices based on a registration list. Thus, the SWM device may be operable to poll once for each previously-registered client device, rather than once for each tuner or tuning channel.

In response to the tuning query, a registered client device may transmit a tuning request to the SWM device. Accordingly, method 500 may optionally include block 512 wherein the SWM device may receive the tuning request from the client device. The tuning request may include a requested IF signal or a requested transponder signal.

Block 514 may optionally include causing the multiswitch to connect at least one of the plurality of IF inputs to at least one of the plurality of tuning channels based on the tuning request. In other words, the SWM controller 260 may cause the multiswitch 212 to electrically-connect the proper IF input from an LNB 120 to one or more tuning channels 220.

As described above, the tuning request may include a plurality of requested IF signals. That is, a client device may request a plurality of requested IF signals and/or requested transponder signals, which may in turn correspond to a 4K bonded transponder transmission. In such a scenario, the SWM controller 260 may be operable to cause the multiswitch 212 to substantially simultaneously communicatively couple the plurality of requested IF signals to the plurality of tuning channels 220.

IV. CONCLUSION

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A device comprising:
   a plurality of frequency conversion modules providing respective tuning channels with respective tuning channel identifiers and respective center frequencies; and
   a controller comprising:
   a processing system including a processor;
       a communication module, wherein the communication module communicates with one or more client devices via a bi-directional communication link;
   a memory that stores executable instructions that, when executed by the processing system, facilitate performance of operations, comprising:
       transmitting registration query from the communication module to the one or more client devices via the bi-directional communication link;
       receiving a registration request from a client device of the one or more client devices, wherein the registration request comprises a client identifier and a tuner quantity indicative of a number of client tuners associated with the client device;
       transmitting a first tuning query to a previously registered client device;
       receiving a first tuning request from the previously registered client device wherein the first tuning request includes a request for a plurality of media content channels and a number of available tuners on the previously registered client device;
       assigning a plurality of tuning channels to the client device according to the plurality of media content channels and the number of available tuners resulting in an assigned plurality of tuning channels;
       transmitting a registration confirmation message to the client device, wherein the registration confirmation message comprises a respective plurality of tuning channel identifiers of the assigned plurality of tuning channels;
       switching a multi-switch to obtain a plurality of intermediate frequency (IF) signals according to the plurality of media content channels, wherein the plurality of IF signals is obtained within a predetermined time threshold; and
       providing the plurality of IF signals to the previously registered client device.

2. The device of claim 1, wherein the operations further comprise:
   transmitting a second tuning query via the bi-directional communication link to the client device;
   receiving a second tuning request from the client device, wherein the second tuning request comprises a requested transponder signal; and
   causing the multi-switch to connect at least one of the plurality of IF inputs to the assigned plurality of tuning channels based on the second tuning request.

3. The device of claim 2 wherein the operations further comprise obtaining a registration list, wherein the registration list comprises the previously registered client device.

4. The device of claim 2, wherein the second tuning request comprises a plurality of requested transponder signals.

5. The device of claim 4 further comprising an output driver, wherein the operations further comprise causing the output driver to provide the plurality of requested transponder signals to the client device via the bi-directional communication link, wherein the plurality of requested transponder signals corresponds to a 4K bonded transponder transmission.

6. The device of claim 4 further comprising an output driver, wherein the operations further comprise causing the output driver to provide the plurality of requested transponder signals to the client device via the bi-directional communication link, wherein the plurality of requested transponder signals corresponds to a multiple transponder transmission.

7. The device of claim 4 wherein the operations further comprise causing of the number of available tuners corresponding to assigned plurality of tuning channels to tune simultaneously to the plurality of requested transponder signals.

8. The device of claim 1, wherein the bi-directional communication link comprises signals having a center frequency of 2.3 MHz and wherein the signals are transmitted and received according to a frequency shift keyed (FSK) communication protocol.

9. A device comprising:
   a plurality of frequency conversion modules;
   a multi-switch;
   a processing system including a processor;
   a communication module, wherein the communication module communicates with one or more client devices via a bi-directional communication link;
   a memory that stores executable instructions that, when executed by the processing system, facilitate performance of operations, comprising:
       transmitting a first tuning query from the communication module via the bi-directional communication link to a client device;
       receiving a first tuning request from the client device, wherein the first tuning request comprises a requested transponder signal;
       transmitting a second tuning query to a previously registered client device;
       receiving a second tuning request from the previously registered client device, wherein the first tuning request includes a request for a plurality of media content channels and a number of available tuners on the previously registered client device; and
       causing the multi-switch to connect a plurality of intermediate frequency (IF) signals according to the plurality of media content channels, wherein the plurality of IF signals is obtained within a predetermined time threshold.

10. The device of claim 9 wherein the operations further comprise obtaining a registration list, wherein the registration list comprises the previously registered client device.

11. The device of claim 9, wherein the first tuning request comprises a plurality of requested transponder signals.

12. The device of claim 11 wherein the operations further comprise simultaneously connecting a plurality of IF inputs corresponding to the plurality of requested transponder signals to assigned plurality of tuning channels.

13. The device of claim 9, wherein the bi-directional communication link comprises signals having a center frequency of 2.3 MHz, wherein the signals are transmitted and received according to a frequency-shift keyed (FSK) communication protocol.

14. A method comprising:
transmitting, by a Single-Wire Multi-switch (SWM) device including a processor, a registration query via a bi-directional communication link, wherein the SWM device comprises a plurality of frequency conversion modules;
receiving, by the SWM device, a registration request from a client device, wherein the registration request comprises a client identifier and a tuner quantity indicative of a number of client tuners associated with the client device;
transmitting, by the SWM device, a first tuning query to a previously registered client device;
receiving, by the SWM device, a first tuning request from the previously registered client device, wherein the first tuning request includes a request for a plurality of media content channels and a number of available tuners on the previously registered client device;
assigning, by the SWM device, a plurality of tuning channels to the client device according to the plurality of media content channels and the number of available tuners;
transmitting, by the SWM device, a confirmation message to the client device, wherein the confirmation message comprises a respective tuning channel identifier;
switching, by the SWM device, to obtain a plurality of intermediate frequency (IF) signals according to the plurality of media content channels, wherein the plurality of IF signals is obtained within a predetermined time threshold; and
providing, by the SWM device, the plurality of IF signals to the previously registered client device.

15. The method of claim 14, wherein the SWM device further comprises a multi-switch, wherein each of the plurality of IF inputs corresponds to one or more respective transponder signals, and the method further comprising:
transmitting, by the SWM device, a second tuning query via the bi-directional communication link;
receiving, by the SWM device, a second tuning request from the client device, wherein the second tuning request comprises a requested transponder signal; and
causing, by the SWM device, the multi-switch to connect at least one of the plurality of IF inputs to assigned plurality of tuning channels based on the second tuning request.

16. The method of claim 15 further comprising obtaining a registration list, wherein the registration list comprises at least one previously-registered client device.

17. The method of claim 15, wherein the second tuning request comprises a plurality of requested transponder signals.

18. The method of claim 17, wherein the SWM device further comprises an output driver, wherein the method further comprises providing, by the SWM device, the plurality of requested transponder signals to the client device via the bi-directional communication link and wherein the plurality of requested transponder signals corresponds to a 4K bonded transponder transmission.

19. The method of claim 17 further comprising simultaneously connecting, by the SWM device, a plurality of IF inputs corresponding to the plurality of requested transponder signals to the assigned plurality of tuning channels.

20. The method of claim 14, wherein the bi-directional communication link comprises signals having a center frequency of 2.3 MHz, wherein the signals are transmitted and received according to a frequency-shift keyed (FSK) communication protocol.

* * * * *